United States Patent [19]

Witt

[11] 4,411,346
[45] Oct. 25, 1983

[54] DISC CLUTCH APPARATUS

[75] Inventor: Ronald A. Witt, Milwaukee, Wis.

[73] Assignee: The Falk Corporation, Milwaukee, Wis.

[21] Appl. No.: 272,537

[22] Filed: Jun. 11, 1981

[51] Int. Cl.³ .................................. F16D 25/08
[52] U.S. Cl. .......................... 192/85 A; 192/86; 192/96; 192/110 B
[58] Field of Search ............. 192/85 A, 86, 85 R, 192/96, 70.13, 91 A, 110 B, 110 R, 20, 34, 66, 101; 308/207 A, 216, 207 R, DIG. 8

[56] References Cited

U.S. PATENT DOCUMENTS

| | | | |
|---|---|---|---|
| 1,608,778 | 11/1926 | Dunwoodie | 192/101 X |
| 2,006,859 | 7/1935 | Gillett | 308/DIG. 8 |
| 2,625,247 | 11/1953 | Shurts | 192/96 X |
| 2,708,993 | 5/1955 | Munschauer | 192/101 X |
| 3,166,167 | 1/1965 | Kinsman | 192/85 A X |
| 3,253,686 | 5/1966 | Scheuerer | 192/66 X |
| 3,262,529 | 7/1966 | Kramer | 192/83 |
| 3,283,866 | 11/1966 | Giacosa | 192/96 |
| 3,921,774 | 11/1975 | Hagen | 192/85 CA |
| 4,094,393 | 6/1978 | Spokas | 192/82 T |

FOREIGN PATENT DOCUMENTS

| | | | |
|---|---|---|---|
| 439616 | 5/1935 | United Kingdom | 308/DIG. 8 |
| 2058249 | 4/1981 | United Kingdom | 192/34 |

Primary Examiner—Rodney H. Bonck
Assistant Examiner—James J. Merek
Attorney, Agent, or Firm—Quarles & Brady

[57] ABSTRACT

A disc clutch arrangement is disclosed within a gear drive. One of the clutch halves is formed on the end of a quill shaft which mounts a driven gear and a hydraulic cylinder. A piston operating within the cylinder is connected to a rod extending through the quill shaft and secured at its opposite end of a pinion shaft which mounts the other half of the disc clutch. The pinion shaft is mounted in bearings, such as straight roller bearings or sleeve bearings, which permit sliding of the pinion shaft axially within the bearings. The clutch is engaged by actuating the hydraulic cylinder thereby causing the rod to draw the pinion shaft and its clutch half towards the quill shaft and its clutch half.

6 Claims, 2 Drawing Figures

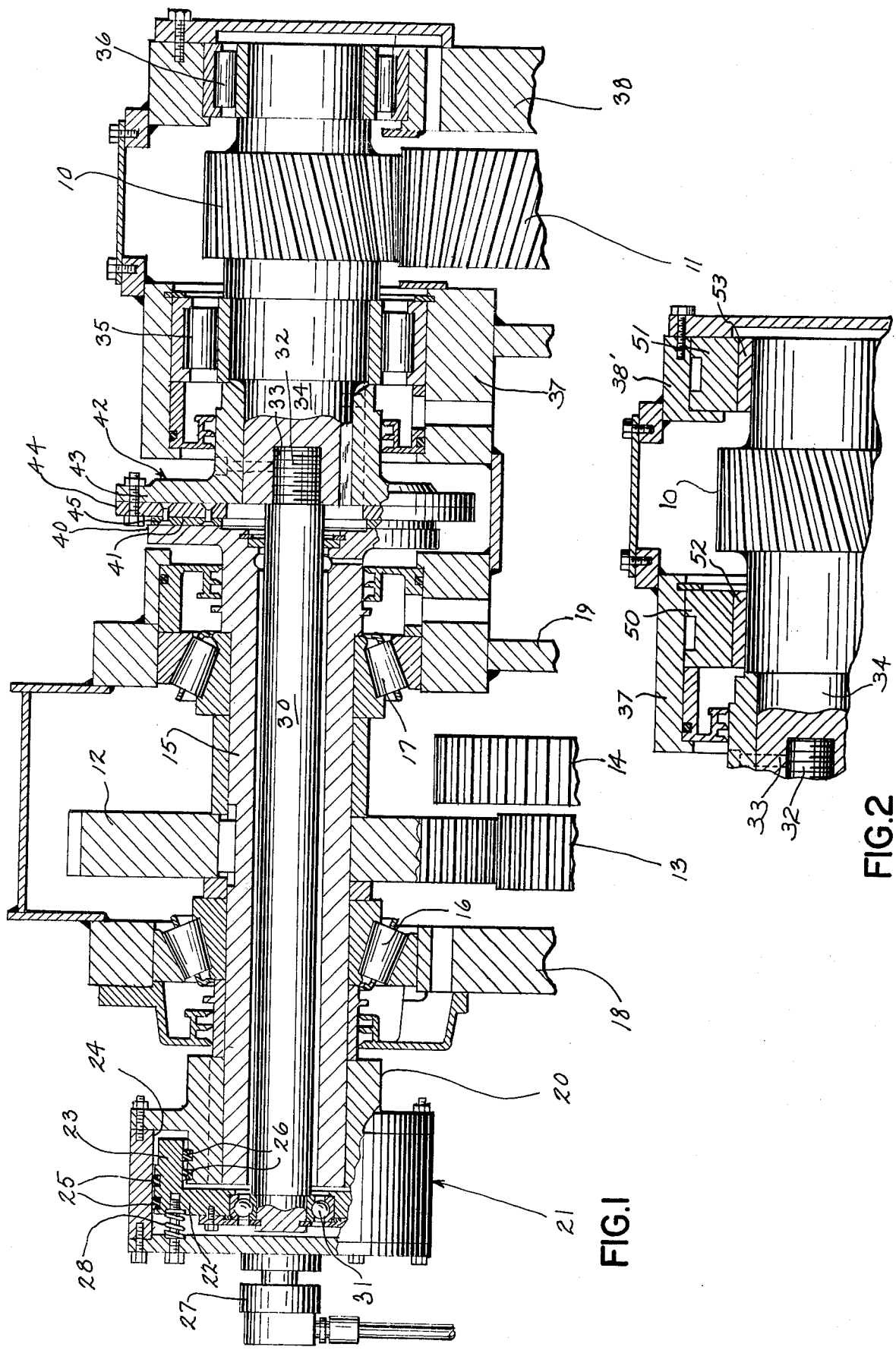

DISC CLUTCH APPARATUS

BACKGROUND OF THE INVENTION

This invention relates to disc clutches, and particularly to an arrangement for engaging a disc clutch.

Disc clutches are often used to selectively engage portions of a gear drive. The disc clutch may consist of a pair of elements having opposing flat surfaces or it may constitute several interdigited plates which are brought together by axial movement of one of the elements or plates relative to the other. When the elements or plates are brought together the clutch is engaged and power can be transmitted through the abutting surfaces.

It is typical to use a spline to mount the element which must move axially for engagement of the disc clutch. The spline ensures the proper radially positioning of the element relative to the axis of the clutch and at the same time permits the necessary sliding motion in the axial direction. However, such splines are expensive to manufacture and can wear excessively under repeated axial motion. Examples of disc clutches which use splines to mount the plates or discs are U.S. Pat. No. 3,262,529 issued July 26, 1966 to Kramer and U.S. Pat. No. 4,094,393 issued June 13, 1978 to Spokas. Another example of a use of a spline to mount the interengaging clutch plates is found in U.S. Pat. No. 3,921,774 issued Nov. 25, 1975 to Hagen. In that later patent the spline member is itself mounted on a shaft on needle bearings and slides axially along the shaft during engagement and disengagement of the clutch.

The apparatus in accordance with my invention completely eliminates the need for splines in a disc clutch for connecting gearing.

SUMMARY OF THE INVENTION

A disc clutch apparatus in accordance with my invention includes a pair of clutch members having engageable clutch faces, one of the clutch members being journaled in and axially restrained in the housing while the other of the clutch members is journaled in and slidably received in a bearing mounted in said housing, together with means for axially shifting the other clutch member toward and away from said one clutch member. Preferably the bearing is a straight roller bearing mounted in the housing but it may also be a sleeve bearing.

The invention further resides in such a disc clutch assembly in which the one clutch member is mounted on a quill shaft while the other clutch member is connected to a rod which extends along the hollow interior of the quill shaft, and wherein a hydraulic cylinder and piston are connected to respective ones of the quill shaft and rod to accomplish the shifting of the clutch members relative to each other.

It is a principal object of the invention to provide a simple but effective disc clutch apparatus for selectively interconnecting gearing.

It is another object of the invention to provide a disc clutch which eliminates the need for splines to accommodate the clutch elements.

It is still a further object of the invention to provide a disc clutch in which the movable clutch element is mounted in straight roller bearings or sleeve bearings which accommodate the necessary axial motion for engagement and disengagement of the clutch.

The foregoing and other objects and advantages of the invention will appear in the following detailed description. In the description reference is made to the accompanying drawing which forms a part hereof and which illustrates preferred embodiments of the invention.

BRIEF DESCRIPTION OF THE DRAWING

FIG. 1 is a view in vertical cross-section through a portion of a gear drive incorporating one embodiment of the disc clutch assembly of the present invention; and FIG. 2 is a partial view in vertical cross-section illustrating an alternative embodiment.

DETAILED DESCRIPTION OF THE PREFERRED EMBODIMENTS

In the arrangement illustrated in FIG. 1, the function of the disc clutch is to connect a helical pinion 10 which meshs with a bull gear 11 with a driving gear train which includes a driving gear 12 meshing with a gear 13. The arrangement illustrated is typical of a marine drive in which the gear 13 is connected to the prime mover and the bull gear 11 is connected to the propeller. Typically there would be a pair of gear trains the second of which would be driven by another gear 14.

The driving gear 12 is mounted on a quill shaft 15 which is journaled in a pair of spaced tapered roller bearings 16 and 17 mounted on an exterior wall 18 and an interior wall 19, respectively, of a housing for the gear drive. The quill shaft 15 is axially restrained relative to the walls. The quill shaft 15 extends through the end wall 18 outwardly of the housing. The outboard end of the quill shaft 15 mounts and has keyed to it the cylinder housing 20 of a hydraulic cylinder mechanism indicated generally by the numeral 21. The hydraulic cylinder mechanism 21 includes a dishlike piston element 22 having an annular flange 23 received within an annular recess 24 formed in the cylinder housing 20. The end and sides of the piston flange 23 are spaced from the opposing sides and bottom of the recess 24. A series of seals 25 and 26 isolate the space surrounding the end of the piston flange 23 from the remaining interior portion of the cylinder housing 20 to define the head or working end of the cylinder mechanism 21. Hydraulic fluid under pressure can be admitted to the head end of the mechanism 21 through a rotary fluid joint 27. Hydraulic fluid under pressure will force the piston 22 away from the end of the quill shaft 15 and a compression spring 28 urges the piston 22 toward the end of the quill shaft 15.

The piston 22 is mounted on the end of an actuating rod 30 by means of a roller bearing 31 which is axially restrained on both the end of the rod 30 and on the piston 22. The rod 30 extends through the hollow interior of the quill shaft 15 and terminates in a threaded end 32 which is engaged in a threaded bore 33 on the end of a pinion shaft 34 which mounts the pinion 10 and which is coaxial with the quill shaft 15. The pinion shaft 34 is journaled in first and second straight roller bearings 35 and 36, respectively, which are in turn mounted in an interior wall 37 and an exterior wall 38, respectively, of the housing. The roller bearings 35 and 36 are disposed on each side of the pinion 10.

Each of roller bearings 35 and 36 has its rollers axially restrained in its outer race, and each outer race is axially restrained within a respective wall 37 and 38. The inner race of each roller bearing is axially restrained on the pinion shaft 34 but the inner race, and therefore the pinion shaft 34, is free to move axially relative to the straight rollers.

The inboard end of the quill shaft 15 projects beyond the wall 19 and is provided with a radial flange 40 which forms one clutch element. The radial flange 40 has a clutch surface 41 which is normal to the axis of the quill shaft 15. The second clutch element 42 is keyed to an end of the pinion shaft 34 outboard of the wall 37. The second clutch member 42 also includes a radial flange 43. A split ring backing member 44 is secured against the normal face of the radial flange 43 and a split ring friction member 45 is removably mounted against the backing member 44. It should be noted that the clutch elements 40 and 42 are disposed in a space or well which is external of the housing and which is formed between two housing sections. In that way, access is available to replace the friction member 45 in case of wear and lubricant from inside the housing is kept away from the operating surfaces of the disc clutch. Suitable labyrinth seals, O-ring seals, and endcap members are provided to insure that lubricant within the housing for the gearing does not find its way to the outside.

In operation, the compression spring 28 normally urges the piston 22 and therefore the rod 30 in a direction towards the pinion shaft 34 thereby urging the disc clutch to a disengaged position. When hydraulic fluid under pressure is admitted to the cylinder end of the hydraulic cylinder mechanism 21, the piston 22 will be moved to the left as viewed in the drawing and will draw the rod 30 and the pinion shaft 34 to the left to engage the operating faces of the clutch elements 40 and 42. If the quill shaft 15 is being driven, that rotation will be transmitted to the pinion shaft 34 and the pinion 10 thereby driving the bull gear 11.

When the clutch is engaged, the pinion shaft 34, the rod 30 and the quill shaft 15 will rotate as a unit. When that happens the roller bearing 31 between the rod 30 and the piston 22 is no longer functioning as a bearing because the mechanism is locked up. Release of the hydraulic fluid pressure in the cylinder mechanism 21 will cause the clutch elements 40 and 42 of the disc clutch to disengage thereby releasing the driving engagement between the quill shaft 15 and the pinion shaft 34. When the hydraulic pressure is released from the cylinder mechanism 21, the piston 22 can rotate on the end of the rod 30. A double acting cylinder mechanism could be employed so as to power the piston 22 in both directions of movement.

The axial motion of the pinion shaft 34 both towards and away from clutch engagement is permitted by the sliding of the inner race of each of the roller bearings 35 and 36 across the rollers of the bearings. The roller bearings 35 and 36 therefore function to both hold the pinion shaft 34 in its proper radial position and also to permit the sliding motion necessary to accommodate the engagement and disengagement of the disc clutch.

The meshing pinion 10 and bull gear 11 would typically be carburized gears to prevent the formation of lips at the axial ends of the teeth caused by the axial movement over only a portion of the width of the gears.

Although in the invention as illustrated in FIG. 1 the straight roller bearings 35 and 36 are shown as having separate inner races, the pinion shaft 34 could function as the inner race. Also, the rollers of the straight roller bearings 35 and 36 could be held against axial movement in their inner race and could be free to slide within a separate outer race or within a housing bore which functions as an outer race.

FIG. 2 illustrates an alternative embodiment which utilizes sleeve bearings in place of the straight roller bearings of the first described embodiment. Specifically, sleeve bearings 50 and 51 are mounted in the interior wall 37 and exterior wall 38, respectively. The sleeve bearings 50 and 51 are each held against axial movement in their respective walls. Each sleeve bearing 50 and 51 contains a babbitted inner surface 52 and 53, respectively, which contacts the outer periphery of the pinion shaft 34 to allow the pinion shaft 34 to slide within the bearings 50 and 51.

Instead of arranging the fluid cylinder 21 at a point remote from the movable clutch element as shown in FIG. 1, the cylinder could be anchored to the end wall 38 with its piston connected directly to the pinion shaft 34. That would eliminate the need for a quill shaft 15 and long rod 30. However, such an arrangement would require replacing the ball bearing 31 with a bearing that can take significant thrust loads while rotating.

I claim:
1. A disc clutch assembly, comprising:
   a housing;
   a driven clutch member journaled in and axially restrained in said housing, said driving clutch member having a clutch face;
   a driven clutch member having a clutch face which confronts the clutch face of said driving clutch member, said driven clutch member being journaled in straight roller bearings the rollers of which are held in outer races mounted in said housing, said driven clutch member being free to slide relative to said rollers; and
   means for axially shifting said driven clutch member toward and away from said driving clutch member, said shifting means including an axially restrained hydraulic cylinder and a piston operating within said cylinder and connected to said driven clutch member;
   said driving clutch member and said hydraulic cylinder being mounted on opposite ends of a quill shaft which also mounts a driving gear, and
   said piston is connected to one end of a rod that extends through the hollow interior of said quill shaft and is joined at its other end to said driven clutch member.

2. A disc clutch assembly, comprising:
   a housing having spaced sections;
   a quill shaft journaled in and axially restrained in one of said housing sections, said quill shaft having a flange at one end disposed between said housing sections and said flange having a clutch face normal to the axis of said quill shaft;
   a driving gear mounted on said quill shaft;
   a pinion shaft having its axis aligned with that of the quill shaft, said pinion shaft being journaled in and slidably received in bearings mounted in the other of said housing sections;
   a clutch member mounted on an end of said pinion shaft between said housing sections and including a flange opposing the flange of said quill shaft;
   a rod connected at one end to said pinion shaft and extending along the hollow interior of said quill shaft;
   a hydraulic cylinder housing mounted on the opposite end of said quill shaft; and a piston disposed in said cylinder housing and journaled on and axially restrained on the opposite end of said rod.

3. A disc clutch assembly in accordance with claim 2 wherein replaceable friction pads are mounted on said flange of said clutch member confronting said clutch face.

4. A disc clutch assembly in accordance with claim 2 wherein said piston and rod are spring biased toward said pinion shaft, said piston being actuated by hydraulic fluid pressure to move in the opposite direction to draw said pinion shaft toward said quill shaft and to thereby engage said clutch.

5. A disc clutch in accordance with claim 2 wherein said bearings are straight roller bearings having their outer races mounted in the other of said housing sections with the rollers of said roller bearings being axially restrained in said outer races and said pinion shaft being free to slide axially relative to said rollers.

6. A disc clutch in accordance with claim 2 wherein said bearings are sleeve bearings mounted in the other of said housing sections and having babbitted inner surfaces journaling said pinion shaft.

* * * * *